United States Patent [19]

Beavon

[11] 4,279,882
[45] Jul. 21, 1981

[54] PROCESS FOR SULFUR PRODUCTION

[75] Inventor: David K. Beavon, Pasadena, Calif.

[73] Assignee: Ralph M. Parsons Company, Pasadena, Calif.

[21] Appl. No.: 33,873

[22] Filed: Apr. 27, 1979

[51] Int. Cl.³ .......................................... C01B 17/04
[52] U.S. Cl. .............................. 423/574 R; 423/576
[58] Field of Search ............... 423/230, 573, 574, 576

[56] References Cited

U.S. PATENT DOCUMENTS

| 2,083,894 | 6/1937 | Connolly | 423/230 X |
| 2,834,653 | 5/1958 | Fleming et al. | 423/576 |
| 3,752,877 | 8/1973 | Beavon | 423/244 A |
| 3,880,986 | 4/1975 | Beavon | 423/576 |
| 4,029,753 | 6/1977 | Beavon | 423/574 |
| 4,088,743 | 5/1978 | Hass et al. | 423/573 X |
| 4,088,744 | 5/1978 | Reed et al. | 423/573 |
| 4,092,404 | 5/1978 | Hass | 423/573 X |
| 4,138,473 | 2/1979 | Gleck | 423/576 X |

OTHER PUBLICATIONS

Perry, "Chemical Engineer's Handbook", McGraw Hill Book Co., Inc., New York, 4th Ed., pp. 9-51 & 9-53.
"Terminal 55", Monsanto Company Bulletin, No. IC/FF33, 4 pp.
"Terminal 60", Monsanto Company Bulletin, No. IC/FF34, 4 pp.
"Terminal 66", Monsanto Company Bulletin, No. IC/FP-64, 6 pp.
Fischer, "Suifor Costs Vary With Process Selection", Hydrocarbon Processing, Mar. 1979, pp. 125-129.
Grekel, "H₂S to S by Direct Oxidation", The Oil & Gas Journal, Jul. 20, 1959, pp. 76-79.
"The Oil and Gas Journal", Mar. 12, 1979, Beavon, Hass, Muke, pp. 76-80.
Paper, 5th Symposium on Catalysts, Beavon and Hass, Oct. 26-27, 1977, Calgary, Alberta, Canada.
"The Oil and Gas Journal", Jul. 20, 1959, Grekel, pp. 76-79.

Primary Examiner—Earl C. Thomas
Attorney, Agent, or Firm—Christie, Parker & Hale

[57] ABSTRACT

Sulfur is produced by contacting, in a catalytic selective oxidation zone, a feed gas comprising an acid gas stream containing from about 1 to 100 percent by volume in admixture with about 70 to 130 percent of the stoichiometric amount of oxygen required for conversion of hydrogen sulfide to sulfur and a recycle gas which is a portion of the gas resulting from condensing sulfur from the effluent of the catalytic selective oxidation zone, with a catalyst selectively capable of oxidizing hydrogen sulfide to sulfur dioxide substantially without formation of sulfur trioxide to form a gas stream comprising hydrogen sulfide, sulfur dioxide and sulfur at a temperature between the kindling temperature of the catalyst and about 850° F. Formed sulfur is condensed from the effluent gas stream and a portion of the substantially sulfur-free effluent returned as recycle gas.

31 Claims, 1 Drawing Figure

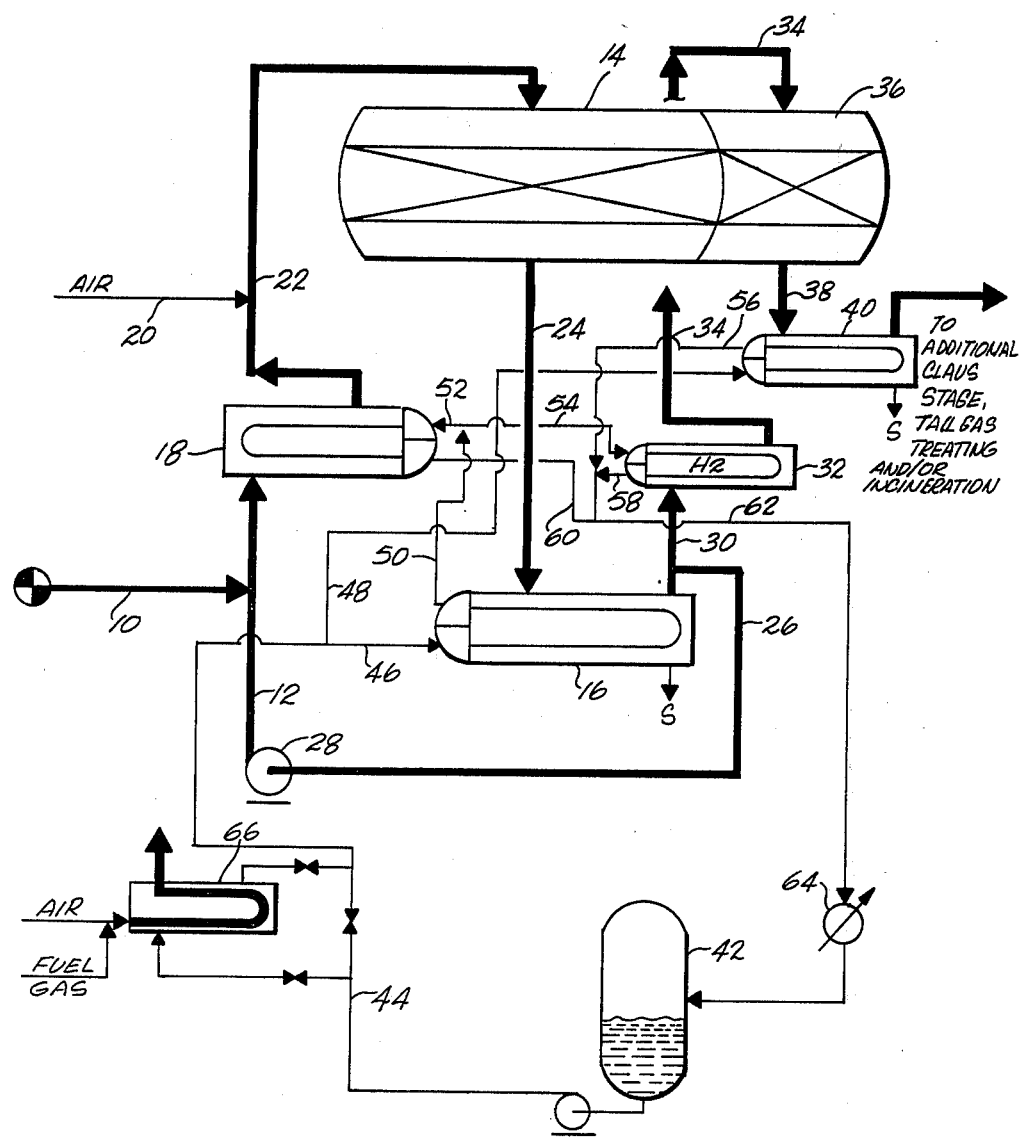

PROCESS FOR SULFUR PRODUCTION

BACKGROUND OF THE INVENTION

The modified Claus process has been widely applied for the production of sulfur from acid gas feeds containing hydrogen sulfide in admixture with varying amounts of carbon dioxide. The acid gas streams usually contain small amounts of hydrocarbons ranging from methane to butane and even hydrocarbons of higher molecular weight. All industrial Claus units start with a thermal reaction zone in which air is added in the stoichiometric quantity needed to react hydrogen sulfide to sulfur by the reaction:

$$H_2S + \tfrac{1}{2}O_2 \rightarrow S + H_2O$$

In the thermal reaction zone, sulfur dioxide is formed. A portion of the formed sulfur dioxide reacts with hydrogen sulfide to form additional sulfur. The main products of the thermal reaction zone are elemental sulfur, sulfur dioxide, unconverted hydrogen sulfide and a considerable amount of heat, which is ordinarily removed by generating steam in a heat exchanger. When hydrocarbons are present, there is also formed carbonyl sulfide and carbon disulfide by competing reactions. The gas from the thermal reaction zone is cooled and sulfur condensed and removed. The gas is reheated and passed to one or more catalytic stages where sulfur dioxide is reacted with hydrogen sulfide over alumina or bauxite catalyst to produce additional sulfur which is removed by cooling and condensation between catalytic stages. The catalytic sulfur forming reaction is:

$$2H_2S + SO_2 \rightleftarrows 3S + 2H_2O$$

In the typical straight-through Claus process, as described above, if the inert content of the acid gas stream (e.g. $CO_2$ or $N_2$) exceeds about 50 percent by volume of the feed, the flame temperature becomes marginally low because of the inert burden. It then becomes necessary to change the flow diagram of the plant by either heating the air and/or the acid gas feed, or diverting part of the acid gas feed around the thermal reaction zone.

With increasing inert content, more and more of the acid gas feed must be diverted, and the thermal reaction zone approaches the situation in which sulfur dioxide is the major product of the thermal reaction zone, with little or no sulfur being formed and with little or no unreacted hydrogen sulfide in the flame. When the inert content of the acid gas reaches 75 to 80 percent, it becomes difficult or impossible to maintain a steady flame reaction, even when all the hydrogen sulfide is converted to sulfur dioxide.

A known method of dealing with a gas containing 80 percent or more inerts is disclosed in my U.S. Pat. No. 3,880,986, incorporated herein by reference. In this process, a thermal reaction is used to produce sulfur dioxide from elemental sulfur formed in the process. In still other cases, a workable flame temperature may be sustained by adding hydrocarbon gas as a fuel. This, however, significantly complicates control of the process, creates the danger of forming tarry products and discolored sulfur, and reduces the recovery of sulfur by forming water, a reaction product which is adverse to the Claus equilibrium. It also amplifies the problem of forming carbonyl sulfide and carbon disulfide, which are difficult to convert on a continuous basis in the Claus plant.

As indicated, all of the industrially used Claus processes involve a thermal reaction step where sulfur dioxide is formed alone or with sulfur, the sulfur dioxide being later reacted with hydrogen sulfide to form sulfur. With no exceptions, the heat generated by the formation of sulfur dioxide is removed in a heat exchanger preceding the catalytic conversion stages. Thus, such plants all require a combustion chamber and a heat exchanger, which constitutes a substantial part of the cost of the entire plant and which adds considerably to the problems of controlling plant operation.

A need exists for an effective process for sulfur production which does not employ an expensive and difficult to control thermal reactor.

SUMMARY OF THE INVENTION

According to the present invention, there is provided a novel Claus process which eliminates the thermal reactor, including its combustion chamber and heat exchanger, and which is applicable to the treatment of gas streams containing from about 1 to 100 percent by volume hydrogen sulfide. The process is particularly suited to small plants having an output of 20 tons per day of sulfur or less and minimizes human supervision.

According to the process of the present invention, sulfur is produced by contacting in a catalytic selective oxidation zone a feed gas comprising an acid gas stream containing from about 1 to 100 percent by volume hydrogen sulfide in admixture with oxygen, normally supplied as air, and present in an amount of from about 70 to 130 percent of the stoichiometric amount required for oxidation of the hydrogen sulfide to elemental sulfur, and a recycle gas which is a portion of a residual gas comprising hydrogen sulfide and sulfur dioxide resulting from condensation of sulfur from the effluent of the catalytic selective oxidation zone, with a selective oxidation catalyst capable of selectively oxidizing hydrogen sulfide to sulfur dioxide substantially without formation of sulfur trioxide. A stoichiometric amount of oxygen is preferably employed. Introduced hydrogen sulfide is catalytically converted to sulfur dioxide and sulfur at a temperature above the kindling temperature of the catalyst and below about 850° F., preferably below 700° F., as controlled by the amount of recycle gas introduced to the catalytic selective oxidation zone. There is formed a product gas stream comprising hydrogen sulfide, sulfur dioxide and sulfur. Normally, the molar ratio of hydrogen sulfide to sulfur dioxide in the gas stream will be about 2:1.

The product gas stream is then cooled to below the dew point of sulfur to condense sulfur and leave a cooled residual gas comprising hydrogen sulfide and sulfur dioxide. A portion of the cooled residual gas is returned as recycle gas to the catalytic selective oxidation zone. The balance may be incinerated, sent to a tail gas treating operation or prior to tail gas treating and/or incineration, heated and passed to a Claus conversion zone to form additional sulfur.

The amount of gas recycled will range from about 0.1 to about 10 moles per mole of acid gas feed, depending upon the hydrogen sulfide content of the acid gas feed with the amount of recycle gas being directly proportional to the hydrogen sulfide concentration.

The upper temperature of 850° F. is to prevent the formation of tarry products from hydrocarbons in the acid gas feed which can lead to deactivation of the catalyst by coking, overheating or sulfation. Where mild steel is the material of construction, as well as when olefins and/or paraffins containing at least three carbon atoms are present in the feed, it is preferred to limit reaction temperature to about 700° F.

As indicated, the catalyst used in the selective oxidation zone is one capable of completely reacting all input oxygen selectively with hydrogen sulfide to form sulfur dioxide without appreciable formation of sulfur trioxide. This is essential to preclude unreacted oxygen and sulfur trioxide contacting the catalyst used in any subsequent Claus catalyst zone to which the gas which is not recycled may be fed. The catalyst should also have the desired characteristic of being substantially incapable of oxidizing hydrogen, methane and carbon monoxide.

The presently preferred catalysts comprise a vanadium oxide and/or sulfide on a non-alkaline porous refractory oxide. Typical catalysts comprise from about 1 to about 30 percent by weight, preferably from about 5 to about 15 percent by weight, of a vanadium compound calculated as the oxide and normally in the oxide and/or sulfate state, preferably as $V_2O_5$, deposited on the non-alkaline refractory oxide support. Such supports include alumina, titania, silica, silica-alumina, magnesia, silica-magnesia, silica-magnesia, zirconia, silica-zirconia, silica-titania, silica-zirconia-titania, certain acid metal phosphates, acid metal arsenates, crystalline or amorphous aluminosilicate hydrogen zeolites having a silica to alumina ratio between about 4:1 and 100:1, and their mixtures. Such catalysts having kindling temperatures as low as about 270° F., and an inlet temperature of about 270° F. to about 450° F., preferably from about 325° F. to about 400° F. is employed.

Preferably, that portion of the gas from the catalytic selective oxidation zone which is not recycled back to the catalytic selective oxidation zone is passed at a temperature from about 350° F., more preferably 400° F. or more, to at least one additional Claus catalytic conversion zone where additional sulfur is formed by reaction of hydrogen sulfide and sulfur dioxide over a conventional Claus catalyst such as alumina or bauxite.

The practice of the process of this invention permits the production of sulfur from acid gas feeds of any hydrogen sulfide concentration without the use of a thermal reaction stage.

BRIEF DESCRIPTION OF THE DRAWINGS

The attached drawing is a flow diagram illustrating the process of the instant invention in its preferred form.

DETAILED DESCRIPTION

The present invention is directed to a process for production of sulfur from hydrogen sulfide solely by the use of catalysts and which does not involve thermal oxidation of hydrogen sulfide.

With reference to the attached Drawing, the acid gas feed containing from 1 to 100 percent by volume hydrogen sulfide in line 10 is combined with recycle gas in line 12. The recycle gas is a portion of the product gas of reactor 14 containing a selective oxidation catalyst, as defined below, after sulfur removal in condenser 16. The mixture after being heated to a temperature sufficient, after accounting for air addition, for feed to reactor 14 in indirect heat exchanger 18 by a suitable heat transfer fluid, is combined with a source of oxygen, typically air, introduced by line 20 to line 22, and passed to catalytic selective oxidation zone 14 at least the kindling temperature of the catalyst contained therein. One or more catalytic selective oxidation zones in series or in parallel may be employed.

Reactor 14 contains a selective oxidation catalyst. By a "selective oxidation catalyst", as used herein, there is meant a catalyst selectively capable of oxidizing hydrogen sulfide to sulfur dioxide, substantially without formation of sulfur trioxide; is preferably incapable of oxidizing hydrogen, methane, and carbon monoxide and is resistant to or incapable of deactivation by sulfur trioxide. Such catalysts include a catalyst containing vanadium in the oxide and/or sulfide state deposited on a non-alkaline porous refractory oxide. Typical catalysts comprise from about 1 to about 30 percent by weight a vanadium compound calculated as the oxide and in the oxide and/or sulfide state, preferably in the form of $V_2O_5$, based on the weight of vanadium compound and support, deposited on a porous refractory oxide essentially free of alkali and alkali earth metals. The refractory oxides may be alumina, titania, silica, silica-alumina, magnesia, silica-magnesia, zirconia, silica-zirconia, silica-titania, silica-zirconia-titania, acid metal phosphates, acid metal arsenates, crystalline or amorphous aluminosilicate hydrogen zeolites having silica to alumina ratio of about 4:1 to 100:1 and the like and mixtures thereof. Such catalysts are described in greater detail in U.S. Pat. Nos. 4,088,743 and 4,092,404, each incorporated herein by reference.

The amount of recycle gas combined with the acid gas feed is predetermined to limit the temperature rise in catalytic reactor 14 to a temperature of 850° F. or less, preferably 700° F. or less. To accomplish the temperature limitation, the amount of recycle gas will range from about 0.1 mole or less per mole of acid gas feed up to about 10 moles or more per mole of acid gas feed. The amount added will depend upon the hydrogen sulfide content of the acid gas feed with the amount of recycle being directly proportional to the hydrogen sulfide concentration of the acid gas feed. Through recycle of the gas from the catalytic selective oxidation zone, there is prevented undesired reactions such as the formation of tarry products from hydrocarbons in the acid gas feed which tend to deactivate the catalyst by coking as well as overheating or sulfation reactions. Where the apparatus is constructed of plain steel, it is preferred to limit temperature rise to below about 700° F. to prevent corrosive conditions. The same is true where the gas contains olefins of more than 3 carbon atoms and/or paraffins. Input temperature depends upon the kindling temperature of the catalyst and is typically in the range of about 270° F. to about 450° F., preferably from about 325° F. to about 400° F. A maximum temperature rise is desired to maximize conversion of hydrogen sulfide to sulfur and sulfur dioxide. Space velocities may range from about 1000 to about 5000 or more volumes per volume of catalyst per hour.

The amount of oxygen combined with the feed gas may range from about 70 to about 130 percent of the stoichiometric amount required for the net reaction:

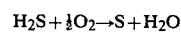

$$H_2S + \tfrac{1}{2}O_2 \rightarrow S + H_2O$$

although a stiochiometric amount is preferred.

The reactions believed to occur include:

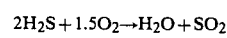

$$2H_2S + 1.5O_2 \rightarrow H_2O + SO_2$$

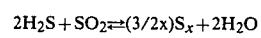

$$2H_2S + SO_2 \rightleftharpoons (3/2x)S_x + 2H_2O$$

In any event, any excess oxygen will generally be consumed and the product gas of catalytic conversion zone 14 will include hydrogen sulfide, sulfur dioxide and sulfur. Water of reaction will be present.

After passing through reactor 14, the gas stream is passed by line 24 to condenser 16, where by cooling, the sulfur formed in reactor 14 is condensed. The residual gas containing hydrogen sulfide and sulfur dioxide and any entrained sulfur is split. A portion is passed by line 26 to compressor 28 and combined with the acid feed gas. The remainder may, depending on pollution regulations, be simply incinertated, subjected to a tail gas treatment such as described in U.S. Pat. No. 3,752,877, incorporated herein by reference, or as shown, passed by line 30 through indirect heat exchanger 32 where it is heated to the kindling temperature of the catalyst contained in reactor 36 and passed by line 34 to second catalytic reactor 36. Second catalytic reactor 36 contains a conventional Claus catalyst such as alumina or bauxite, with alumina being preferred. In the second catalytic reactor 36, hydrogen sulfide and sulfur dioxide in the gas stream react to form additional sulfur by the conventional Claus reaction:

$$2H_2S + SO_2 \rightleftharpoons 3S + 2H_2O$$

Inlet temperatures range from about 350° F. to about 400° F. The product gas is passed by line 38 to condenser 40 where the formed sulfur is collected. Depending upon the degree of conversion achieved, the gas stream from condensor 40 may be passed to tail gas treatment or reheated and passed to one or more additional Claus conversion stages corresponding to catalytic reactor 36, with intermediate condensation of sulfur and reheating of the gas stream prior to passage to the next catalytic conversion stage.

In the process sequence, a single heat transfer fluid such as steam, Dowtherm ™, Therminol ™, Mobiltherm ™ and the like, may be used effectively for complete control of the process. A fluid which remains liquid throughout the process with a low enough vapor pressure to operate as close as possible to atmospheric is preferred. Suitable fluids include high-boiling Dowtherm ™, mixture of diphenyl and diphenyl oxide Mobiltherm ™ 600, a an aromatic mineral oil Therminol ™ 55, a clear yellow synthetic hydrocarbon mixture boiling in the range of 635° F. to 734° F. Therminol ™ 60, a polyaromatic compound boiling in the range of 550° F. to 741° F. Therminol ™ 66, a modified terphenyl and the like. The heat transfer sequence shown is for use of a single fluid which substantially remains liquid.

The heat exchange fluid is pumped from storage tank 42 through line 44 and split. A portion is passed by line 46 to indirect heat exchanger 16 and the balance by line 48 to cooler 40. The effluent from indirect heat exchanger 16, which receives the heat of cooling and condensation of sulfur, leaves heat exchanger 16 by line 50 and is again split. A portion is passed by line 52 to indirect heat exchanger 18 for heating the feed gas stream, and the balance by line 54 to indirect heat exchanger 32, which provides heat to the gas passing from indirect heat exchanger 16 to catalytic reactor 36. The effluent from indirect heat exchanger 40 exiting by line 56, is combined with the effluent from indirect heat exchanger 32, exiting by line 58, and the effluent from indirect heat exchanger 18, exiting by line 60, and they are combined in line 62 for passage through trim cooler 64 for return to reservoir 42. Indirect gas-fired heat exchanger 66 is employed for startup operations and, if necessary, to provide auxiliary heat for the process.

Any tail gas may be treated for recovery of sulfur values, preferably in accordance with U.S. Pat. No. 3,752,877 incorporated herein by reference.

EXAMPLE 1

A feed of 357.29 moles per hour of an acid gas containing about 88.18 moles $H_2S$, 22.66 moles $H_2O$, 243.22 moles $CO_2$, 1.36 moles $C_2$ hydrocarbons, 0.41 mole $C_2$ hydrocarbons, 1.17 moles $C_3$ hydrocarbons, 0.25 mole $NC_4$ hydrocarbons and 0.04 mole $NC_5$ hydrocarbons at a pressure of 24.70 psia and at a temperature of 110° F. is combined with about 2145 moles per hour of the effluent of condenser 16 as recycle gas and having the approximate composition shown in Table 1.

TABLE 1

| Component | Moles/Hr. |
|---|---|
| $H_2S$ | 40.34 |
| $SO_2$ | 20.18 |
| $H_2O$ | 434.53 |
| $O_2$ | 0.00 |
| $N_2$ | 663.30 |
| $S_2$ | .00 |
| $S_4$ | .00 |
| $S_6$ | .18 |
| $S_8$ | .20 |
| $CO_2$ | 972.75 |
| $H_2$ | 0.00 |
| $CO$ | 0.00 |
| $COS$ | .17 |
| $CS_2$ | 0.00 |
| $C_1$ | 5.44 |
| $C_2$ | 1.64 |
| $C_3$ | 4.68 |
| $NC_4$ | 1.00 |
| $NC_5$ | .16 |

The effluent recycle gas temperature is about 350° F. and the pressure is 22.1 psia. Air at 180° F. in an amount of 216.34 moles per hour is combined with the mixture of acid gas and recycle gas and fed to reactor 14 containing Selectox-32, a selective oxidation catalyst available from Union Oil Company of California, at a temperature of about 375° F. and at a pressure of 22.0 psia. The exit gas leaves reactor 14 at a temperature of about 670° F., a pressure of about 21.31 psia, at a rate of about 2692 moles per hour and has the approximate composition shown in Table 2.

TABLE 2

| Component | Moles/Hr. |
|---|---|
| $H_2S$ | 50.18 |
| $SO_2$ | 25.09 |
| $H_2O$ | 542.01 |
| $O_2$ | .00 |
| $N_2$ | 829.07 |
| $S_2$ | 1.30 |
| $S_4$ | .05 |
| $S_6$ | 9.77 |
| $S_8$ | 1.83 |
| $CO_2$ | 1215.93 |
| $H_2$ | 0.00 |
| $CO$ | 0.00 |
| $COS$ | .20 |
| $CS_2$ | .00 |
| $C_1$ | 6.80 |
| $C_2$ | 2.05 |
| $C_3$ | 5.85 |
| $NC_4$ | 1.25 |
| $NC_5$ | .20 |

After sulfur condensation in condenser 16, about 80 percent of the gas is recycled to reactor 16 and the balance fed at a temperature of 430° F. to a Claus reactor containing an alumina catalyst. Sulfur in the effluent of the Claus reactor is condensed at 350° F. to give an overall sulfur recovery of about 92 percent before tail gas treatment to recover residual sulfur.

EXAMPLE 2

Example 1 is repeated except that sulfur is condensed after the Claus reactor at 280° F., for an overall recovery of 94.86 percent before tail gas treatment.

EXAMPLE 3

Example 1 is repeated except two Claus conversion stages are employed following the selective oxidation stage to give an overall sulfur recovery of 96.67 percent prior to tail gas treatment.

What is claimed is:

1. A process for the production of sulfur with control of process temperature by use of a liquid heat transfer fluid which comprises:
   (a) providing a closed loop heat transfer system including a liquid heat transfer fluid;
   (b) condensing sulfur from a product gas stream containing sulfur, sulfur dioxide, and hydrogen sulfide by indirect heat exchange with cooled liquid heat transfer fluid stream in a first indirect heat exchange zone to provide a cooled residual gas comprising hydrogen sulfide and sulfur dioxide and a heated liquid heat transfer fluid stream, said product gas stream being formed by contacting, in a catalytic selective oxidation zone, a feed gas heated, at least in part, for feed to said catalytic selective oxidation zone by indirect heat exchange with a first portion of the heated liquid heat transfer fluid stream in a second indirect heat exchange zone, said feed gas comprising an acid gas stream containing from about 1 to 100 percent by volume hydrogen sulfide in admixture with oxygen present in an amount of from about 70 to 130 percent of the stoichiometric amount required for oxidation of the hydrogen sulfide to elemental sulfur and a recycle gas which is a portion of a residual gas comprising hydrogen sulfide and sulfur dioxide resulting from condensation of sulfur from the effluent of the catalytic selective oxidation zone, with a selective oxidation catalyst capable of selectively oxidizing hydrogen sulfide to sulfur dioxide substantially without formation of sulfur trioxide and catalytically converting introduced hydrogen sulfide to sulfur dioxide and sulfur at a temperature above the kindling temperature of the catalyst and below an upper reaction temperature of about 850° F., the upper reaction temperature being selectively controlled by the amount of recycle gas introduced to the catalytic selective oxidation zone;
   (c) indirectly heating the balance of cooled residual gas exiting the first heat exchange zone in a third indirect heat exchange zone with a second portion of the heated liquid heat transfer fluid stream to a temperature for feed to a Claus conversion stage;
   (d) passing the heated balance of the residual gas stream to at least one Claus conversion zone to form additional sulfur; and
   (e) combining liquid heat transfer fluid streams from the second and third indirect heat exchange zones and cooling the combined liquid heat transfer fluid streams for recycle to the process.

2. A process as claimed in claim 1 in which the upper reaction temperature is below about 700° F.

3. A process as claimed in claim 1 in which the amount of cooled residual gas returned to the catalytic selective oxidation zone is about 0.1 to about 10 moles per mole of acid gas feed.

4. A process as claimed in claim 1 in which the amount of oxygen introduced is about the stoichiometric amount required for conversion of hydrogen sulfide to sulfur.

5. A process as claimed in claim 1 in which the feed gas is introduced to the catalytic selective oxidation zone at a temperature from about 270° F. to about 450° F.

6. A process as claimed in claim 1 in which the feed gas is introduced to the catalytic selective oxidation zone at a temperature from about 325° F. to about 400° F.

7. A process as claimed in claim 1 in which the oxygen is provided as air.

8. A process for the production of sulfur with control of process temperature by use of a liquid heat transfer fluid which comprises:
   (a) providing a closed loop heat transfer system containing a liquid heat transfer fluid;
   (b) condensing sulfur from a product gas stream containing sulfur, sulfur dioxide, and hydrogen sulfide by indirect heat exchange with cooled liquid heat transfer fluid stream in a first indirect heat exchange zone to provide a cooled residual gas comprising hydrogen sulfide and sulfur dioxide and a heated liquid heat transfer fluid stream, said product gas stream being formed by introducing to a catalytic selective oxidation zone, a feed gas heated, at least in part, for feed to said catalytic selective oxidation zone by indirect heat exchange with a first portion of the heated liquid heat transfer fluid stream in a second indirect heat exchange zone, said feed gas comprising an acid gas stream containing from about 1 to 100 percent by volume hydrogen sulfide in admixture with oxygen present in an amount of from about 70 to 130 percent of the stoichiometric amount required for oxidation of the hydrogen sulfide to elemental sulfur and a recycle gas which is a portion of a residual gas comprising hydrogen sulfide and sulfur dioxide resulting from condensation of sulfur from the effluent of the catalytic selective oxidation zone, at an inlet temperature of from about 270° F. to about 450° F. and contacting the feed gas with a selective oxidation catalyst capable of selectively oxidizing hydrogen sulfide to sulfur dioxide substantially without formation of sulfur trioxide, said catalyst comprising vanadium oxide and/or sulfide as an essential active ingredient supported on a non-alkaline porous refractory oxide, and catalytically converting introduced hydrogen sulfide to sulfur dioxide and sulfur below an outlet temperature of about 850° F., said outlet temperature controlled by the amount of recycle gas introduced to the catalytic selective oxidation zone;
   (c) indirectly heating the balance of cooled residual gas exiting the first heat exchange zone in a third indirect heat exchange zone with a second portion of the heated liquid heat transfer fluid stream to a temperature for feed to a Claus conversion stage;

(d) passing the heated balance of the residual gas stream to at least one Claus conversion zone to form additional sulfur; and (e) combining liquid heat transfer fluid streams from the second and third indirect heat exchange zones and cooling the combined liquid heat transfer fluid streams for recycle to the process.

9. A process as claimed in claim 8 in which the catalyst comprises from about 1 to about 30 percent by weight of vanadium oxide and/or sulfide, calculated as the oxide, based on the weight of vanadium oxide and the non-alkaline porous refractory oxide support.

10. A process as claimed in claim 8 in which the catalyst comprises from about 1 to about 15 percent by weight vanadium oxide and/or sulfide, calculated as the oxide, based on the weight of vanadium oxide and the non-alkaline porous refractory oxide support.

11. A process as claimed in claim 8 in which the non-alkaline porous refractory oxide support is selected from the group consisting of alumina, titania, silica, silica-alumina, magnesia, silica-magnesia, zirconia, silica-zirconia, silica-titania, silica-zirconia-titania, acid metal phosphates, acid metal arsenates, crystalline or amorphous aluminosilicate hydrogen zeolites having a silica to alumina ratio between about 4:1 and 100:1, and mixtures thereof.

12. A process as claimed in claim 8 in which at least a portion of the vanadium is in the form of $V_2O_5$.

13. A process as claimed in claim 8 in which the upper reaction temperature is below about 700° F.

14. A process as claimed in claim 8 in which the amount of cooled residual gas returned to the catalytic selective oxidation zone is about 0.1 to about 10 moles per mole of acid gas feed.

15. A process as claimed in claim 8 in which the amount of oxygen introduced is about the stoichiometric amount required for conversion of hydrogen sulfide to sulfur.

16. A process as claimed in claim 8 in which the feed gas is introduced to the catalytic selective oxidation zone at a temperature from about 325° F. to about 400° F.

17. A process as claimed in claim 8 in which the oxygen is provided as air.

18. A process for the production of sulfur with control of process temperature by use of a liquid heat transfer fluid which comprises:

(a) providing a closed loop heat transfer system containing a liquid heat transfer fluid;

(b) condensing sulfur from a product gas stream containing sulfur, sulfur dioxide, and hydrogen sulfide by indirect heat exchange with cooled liquid heat transfer fluid stream in a first indirect heat exchange zone to provide a cooled residual gas comprising hydrogen sulfide and sulfur dioxide and a heated liquid heat transfer fluid stream, said product gas stream being formed by introducing to a catalytic selective oxidation zone, a feed gas heated, at least in part, for feed to said catalytic selective oxidation zone by indirect heat exchange with a first portion of the heated liquid heat transfer fluid stream in a second indirect heat exchange zone, said feed gas comprising an acid gas stream containing from 1 to about 100 percent by volume hydrogen sulfide in admixture with sufficient air to provide oxygen in an amount of from about 70 to 130 percent of the stoichiometric amount required for oxidation of the hydrogen sulfide to elemental sulfur and a recycle gas which is a portion of a residual gas comprising hydrogen sulfide and sulfur dioxide resulting from condensation of sulfur from the effluent of the catalytic selective oxidation zone, at an inlet temperature of from about 270° F. to about 450° F. and contacting the feed gas with a selective oxidation catalyst capable of selectively oxidizing hydrogen sulfide to sulfur dioxide substantially without formation of sulfur trioxide, said catalyst comprising vanadium oxide and/or sulfide as an essential ingredient deposited on a non-alkaline porous refractory oxide support, said support containing from about 1 to about 30 percent by weight of vanadium oxide and/or vanadium sulfide, calculated as vanadium oxide, based on the weight of the vanadium oxide and the support, said support selected from the group consisting of alumina, titania, silica, silica-alumina, magnesia, zirconia, silica-zirconia, silica-titania, silica-zirconia-titania, acid metal phosphates, and metal arsenates, crystalline or amorphous aluminosilicate hydrogen zeolites having a silica to alumina ratio between about 4:1 and 100:1 and mixtures thereof, and catalytically converting the introduced hydrogen sulfide to sulfur dioxide and sulfur at a temperature below about 850° F., maintained by the introduction of from about 0.1 to about 10 moles of recycle gas per mole of acid gas feed;

(c) indirectly heating the balance of cooled residual gas exiting the first heat exchange zone in a third indirect heat exchange zone with a second portion of the heated liquid heat transfer fluid stream to a temperature for feed to a Claus conversion stage;

(d) passing the heated balance of the residual gas stream to at least one Claus conversion zone to form additional sulfur; and (e) combining liquid heat transfer fluid streams from the second and third indirect heat exchange zones and cooling the combined liquid heat transfer fluid streams for recycle to the process.

19. A process as claimed in claim 18 in which the catalyst comprises from about 1 to about 15 percent by weight vanadium oxide and/or sulfide, calculated as the oxide, based on the weight of vanadium oxide and the non-alkaline porous refractory oxide support.

20. A process as claimed in claim 18 in which at least a portion of the vanadium is in the form of $V_2O_5$.

21. A process as claimed in claim 18 in which the upper reaction temperature is below about 700° F.

22. A process as claimed in claim 18 in which the amount of oxygen introduced is about the stoichiometric amount required for conversion of hydrogen sulfide to sulfur.

23. A process as claimed in claim 18 in which the feed gas is introduced to the catalytic selective oxidation zone at a temperature from about 325° F. to about 400° F.

24. A process for the production of sulfur with control of process temperature by use of a heat transfer fluid which comprises:

(a) providing a closed loop heat transfer system containing a liquid heat transfer fluid;

(b) condensing sulfur from a product gas stream containing sulfur, sulfur dioxide, and hydrogen sulfide by indirect heat exchange with cooled heat transfer fluid stream in a first indirect heat exchange zone to provide a cooled residual gas comprising hydrogen sulfide and sulfur dioxide and a heated heat transfer fluid stream, said product gas stream being formed by contacting, in a catalytic selective oxidation zone, a feed gas heated, at least in part, for feed to said catalytic selective oxidation zone by indirect heat exchange with a first portion of the heated heat transfer fluid stream in a second indirect heat exchange zone, said feed gas comprising an acid gas stream containing from about 1 to 100 percent by volume hydrogen sulfide in admixture with oxygen present in an amount of from about 70 to 130 L percent of the stoichiometric amount required for oxidation of the hydrogen sulfide to elemental sulfur and a recycle gas which is a portion of the cooled residual gas comprising hydrogen sulfide and sulfur dioxide exiting the first indirect heat exchange zone, with a selective oxidation catalyst capable of selctively oxidizing hydrogen sulfide to sulfur dioxide substantially without formation of sulfur trioxide and catalytically converting introduced hydrogen sulfide to sulfur dioxide and sulfur at a temperature above the kindling temperature of the catalyst and below an upper reaction temperature of about 850° F., the upper reaction temperature being selectively controlled by the amount of recycle gas introduced to the catalytic selective oxidation zone;

(c) indirectly heating the balance of cooled residual gas exiting the first heat exchange zone in a third indirect heat exchange zone with a second portion of the heated heat transfer fluid stream to a temperature for feed to a Claus conversion stage;

(d) passing the heated balance of the residual gas stream to at least one Claus conversion zone to form additional sulfur; and (e) combining heat transfer fluid streams from the second and third indirect heat exchange zones and cooling the combined heat transfer fluid streams for recycle to the process.

25. A process as claimed in claim 24 in which a portion of the cooled heat transfer fluid is utilized to condense sulfur from the effluent of at least a first Claus conversion zone following the catalytic selective oxidation zone by indirect heat exchange in a fourth heat exchange zone with the effluent of said first Claus conversion zone and combining the heat transfer fluid from the fourth heat exchange zone with the heat exchange fluids from the second and third heat exchange zones.

26. A process as claimed in claim 24 in which the upper reaction temperature is below about 700° F.

27. A process as claimed in claim 24 in which the catalyst comprises a vanadium oxide and/or sulfide supported on a non-alkaline porous refractory oxide.

28. A process as claimed in claim 27 in which the amount of oxygen introduced is about the stoichiometric amount required for conversion of hydrogen sulfide to sulfur.

29. A process as claimed in claim 1 in which a portion of the cooled liquid heat transfer fluid is utilized to condense sulfur from the effluent of at least a first Claus conversion zone following the catalytic selective oxidation zone by indirect heat exchange in a fourth heat exchange zone with the effluent of said first Claus conversion zone and combining the liquid heat transfer fluid from the fourth heat exchange zone with the liquid heat exchange fluids from the second and third heat exchange zones.

30. A process as claimed in claim 8 in which a portion of the cooled liquid heat transfer fluid is utilized to condense sulfur from the effluent of at least a first Claus conversion zone following the catalytic selective oxidation zone by indirect heat exchange in a fourth heat exchange zone with the effluent of said first Claus conversion zone and combining the liquid heat transfer fluid from the fourth heat exchange zone with the liquid heat exchange fluids from the second and third heat exchange zones.

31. A process as claimed in claim 18 in which a portion of the cooled liquid heat transfer fluid is utilized to condense sulfur from the effluent of at least a first Claus conversion zone following the catalytic selective oxidation zone by indirect heat exchange in a fourth heat exchange zone with the effluent of said first Claus conversion zone and combining the liquid heat transfer fluid from the fourth heat exchange zone with the liuqid heat exchange fluids from the second and third heat exchange zones.

* * * * *